US011634294B2

United States Patent
Hiroyasu

(10) Patent No.: US 11,634,294 B2
(45) Date of Patent: Apr. 25, 2023

(54) SHEET-FEEDING DEVICE AND SHEET-FEEDING METHOD

(71) Applicant: ZUIKO CORPORATION, Osaka (JP)

(72) Inventor: Masato Hiroyasu, Osaka (JP)

(73) Assignee: ZUIKO CORPORATION, Osaka (JP)

( * ) Notice: Subject to any disclaimer, the term of this patent is extended or adjusted under 35 U.S.C. 154(b) by 0 days.

(21) Appl. No.: 17/252,507

(22) PCT Filed: Jul. 25, 2019

(86) PCT No.: PCT/JP2019/029139
§ 371 (c)(1),
(2) Date: Dec. 15, 2020

(87) PCT Pub. No.: WO2020/031705
PCT Pub. Date: Feb. 13, 2020

(65) Prior Publication Data
US 2021/0261372 A1    Aug. 26, 2021

(30) Foreign Application Priority Data
Aug. 7, 2018 (JP) .............................. JP2018-148517

(51) Int. Cl.
*B29C 65/00* (2006.01)
*B65H 19/18* (2006.01)
(Continued)

(52) U.S. Cl.
CPC .......... *B65H 19/1805* (2013.01); *B29C 65/48* (2013.01); *B29C 65/7867* (2013.01); *B29C 65/7894* (2013.01); *B29C 66/43* (2013.01)

(58) Field of Classification Search
CPC . B29C 65/48; B29C 65/7867; B29C 65/7894; B29C 66/43
See application file for complete search history.

(56) References Cited

FOREIGN PATENT DOCUMENTS

| EP | 1 894 871 | 3/2008 |
|---|---|---|
| JP | 8-175712 | 7/1996 |

(Continued)

OTHER PUBLICATIONS

JP 2017/178544 specification translation (Year: 2017).*
(Continued)

*Primary Examiner* — Philip C Tucker
*Assistant Examiner* — Nickolas R Harm
(74) *Attorney, Agent, or Firm* — Wenderoth, Lind & Ponack, L.L.P.

(57) ABSTRACT

A first shaft control section is configured to control rotation of a first support shaft supporting a first roll such that a sheet is unwound from the first roll at a predetermined running speed. A second shaft control section is configured to execute a first rotation control of regulating a rotational speed of a second support shaft supporting a second roll such that a peripheral speed of the second roll coincides with the predetermined running speed of the sheet of the first roll. The second shaft control section is configured to regulate the rotational speed of the second support shaft by acceleration or deceleration such that an adhesive on an outer peripheral surface of the second roll arrives at a pressing position when a target joining portion of the sheet of the first roll meets the pressing position.

7 Claims, 9 Drawing Sheets

(51) Int. Cl.
  *B29C 65/78* (2006.01)
  *B29C 65/48* (2006.01)

(56) References Cited

FOREIGN PATENT DOCUMENTS

| | | |
|---|---|---|
| JP | 8-217298 | 8/1996 |
| JP | 2568743 | 4/1998 |
| JP | 10-203697 | 8/1998 |
| JP | 2002-338098 | 11/2002 |
| JP | 2006-188348 | 7/2006 |
| JP | 2017-149551 | 8/2017 |
| JP | 2017-178544 | 10/2017 |

OTHER PUBLICATIONS

JP 2017/149551 specification translation (Year: 2016).*
International Search Report dated Sep. 10, 2019 in International (PCT) Application No. PCT/JP2019/029139.
Extended European Search Report dated Feb. 22, 2022 in European Patent Application No. 19847472.8.

* cited by examiner

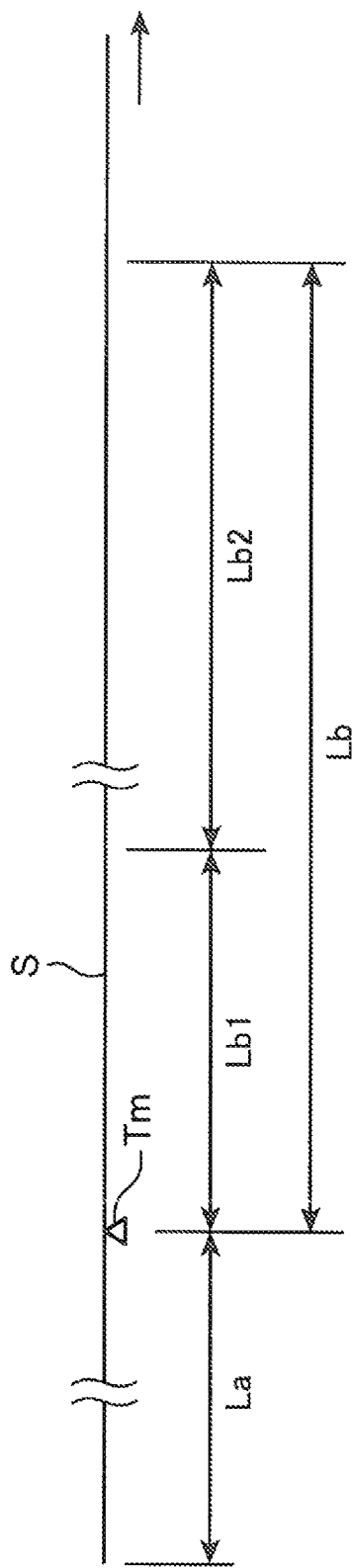

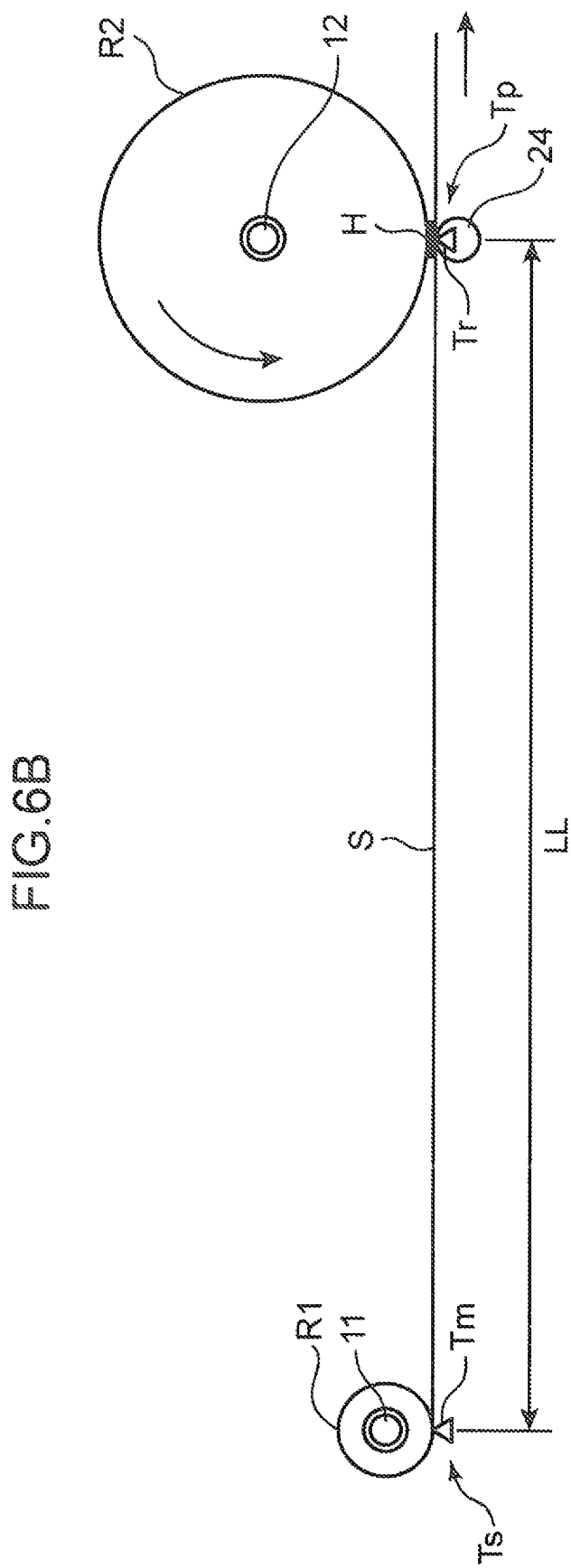

SHEET-FEEDING DEVICE AND SHEET-FEEDING METHOD

TECHNICAL FIELD

The present invention relates to a sheet supply apparatus and a sheet supply method for continuously supplying a sheet from a roll of sheet.

BACKGROUND ART

There have been conventionally known sheet supply apparatus for sequentially unwinding a sheet from a first roll of sheet and a second roll of sheet for sheet supply (for example, see Registered Japanese Utility-Model Publication No. 2568743). This sort of sheet supply apparatus includes a joining mechanism for joining the sheet of the first roll (a supply roll) in a supply state of supplying the sheet to the sheet of the second roll (a standby roll) in a standby state of suspending the supply of the sheet when a residual length of the sheet of the first roll reaches a predetermined residual length or shorter.

When the residual length of the sheet of the first roll reaches the predetermined length or shorter, an instructive signal instructing the joining mechanism to operate is output. In response, the joining mechanism joins the respective sheets of the first and second rolls to each other by a pressing operation of pressing the sheet of the first roll to an adhesive provided on an outer peripheral surface of the second roll in a state where a support shaft of the second roll rotates so that a peripheral speed of the second roll coincides with a running speed of the sheet run from the first roll.

As described above, the instructive signal is output for the joining operation when the residual length of the sheet of the first roll reaches the predetermined residual length or shorter. Here, the adhesive on the outer peripheral surface of the second roll does not always arrive at a pressing position where the joining mechanism performs the pressing operation at a constant time. Therefore, a period of elapsed time until the joining mechanism performs the pressing operation after the instructive signal is output is variable, and thus the length of the sheet unwound from the first roll during the period of elapsed time is not uniform. As a result, the residual length of the sheet of the first roll becomes variable in the joining of the sheets via the adhesive. To avoid the variable residual length, it is necessary to output the instructive signal while maintaining a maximal supply length of the sheet, and hence the residual length is always wastefully excessive. Concisely, the conventional sheet supply apparatus has a problem that it is difficult to lead the residual length of the sheet of the first roll to a predetermined target residual wound length when joining the sheets to each other via the adhesive.

SUMMARY OF INVENTION

The present invention has been accomplished in view of the aforementioned problem, and an object of the present invention is to provide a sheet supply apparatus and a sheet supply method for leading a residual length of a sheet of a first roll to a predetermined target residual wound length when joining the sheet of the first roll and a sheet of a second roll to each other via an adhesive on an outer peripheral surface of the second roll.

A sheet supply apparatus according to one aspect of the present invention is a sheet supply apparatus for sequentially unwinding a sheet from a first roll of sheet and a second roll of sheet for sheet supply. The sheet supply apparatus includes: a first support shaft which rotatably supports the first roll at a center position thereof; a second support shaft which rotatably supports the second roll at a center position thereof; a joining mechanism which joins the respective sheets of the first roll and the second roll to each other by a pressing operation of pressing the sheet run from the first roll rotating in association with rotation of the first support shaft to an adhesive provided on an outer peripheral surface of the second roll rotating in association with rotation of the second support shaft; and a controller which controls the rotation of each of the first support shaft and the second support shaft so that a target joining portion of the sheet run from the first roll is joined to the adhesive on the outer peripheral surface of the second roll owing to the pressing operation by the joining mechanism when a residual length of the sheet of the first roll reaches a predetermined target residual wound length. The controller includes: a residual length calculation section which calculates a radius of the first roll that changes in accordance with the sheet supply from the first roll, and calculates a residual length of the sheet of the first roll from a result of the radius calculation; a residual length monitoring section which monitors the residual length of the sheet of the first roll that has been calculated by the residual calculation section, and outputs a control instructive signal when the residual length of the sheet reaches a watch length that is a sum of a predetermined length and the target residual wound length; a first shaft control section which controls the rotation of the first support shaft in response to the control instructive signal so that the sheet is unwound from the first roll for the sheet supply at a predetermined running speed; and a second shaft control section which controls the rotation of the second support shaft in response to the control instructive signal. The second shaft control section is configured to regulate a rotational speed of the second support shaft so that a peripheral speed of the second roll coincides with the running speed of the sheet of the first roll, and the adhesive on the outer peripheral surface of the second roll arrives at a pressing position where the joining mechanism performs the pressing operation when the target joining portion of the sheet of the first roll meets the pressing position.

A sheet supply method according to another aspect of the present invention is a sheet supply method for sequentially unwinding a sheet from a first roll of sheet and a second roll of sheet for sheet supply by using a sheet supply apparatus including: a first support shaft which rotatably supports the first roll of sheet at a center position thereof; a second support shaft which rotatably supports the second roll of sheet at a center position thereof; and a joining mechanism which joins the respective sheets of the first roll and the second roll to each other by a pressing operation of pressing the sheet run from the first roll to an adhesive provided on an outer peripheral surface of the second roll. The sheet supply method includes: a sheet supply step of unwinding the sheet from the first roll at a predetermined running speed by rotating the first support shaft for sheet supply; a rotational speed regulation step of regulating a rotational speed of the second support shaft so that a peripheral speed of the second roll coincides with the running speed of the sheet of the first roll and the adhesive on the outer peripheral surface of the second roll arrives at a pressing position where the pressing operation is performed by the joining mechanism when a target joining portion of the sheet unwound from the first roll meets the pressing position, a residual length of the sheet of the first roll reaching a predetermined target residual wound length at the target joining portion; and a joining step of causing the joining mechanism to perform the pressing operation so that the target joining portion of the sheet of the first roll is joined to the adhesive on the outer peripheral surface of the second roll.

According to the present invention, it is possible to lead a residual length of a sheet of a first roll to a predetermined target residual wound length when joining respective sheets of the first roll and a second roll to each other via an adhesive on an outer peripheral surface of the second roll.

The object, features, and advantages of the present invention will be further clarified by the following detailed description and the accompanying drawings.

BRIEF DESCRIPTION OF DRAWINGS

FIG. 6A is a view schematically showing a state where the sheet of the first roll is unwound from the first roll.

FIG. 6B is a view explaining a processing of controlling rotation of a second support shaft to be executed by the controller.

DESCRIPTION OF EMBODIMENTS

Hereinafter, a sheet supply apparatus and a sheet supply method according to an embodiment of the present invention will be described with reference to the accompanying drawings. It should be noted that the following embodiment will be described as examples without limiting the technical scope of the present invention.

Figure 1:
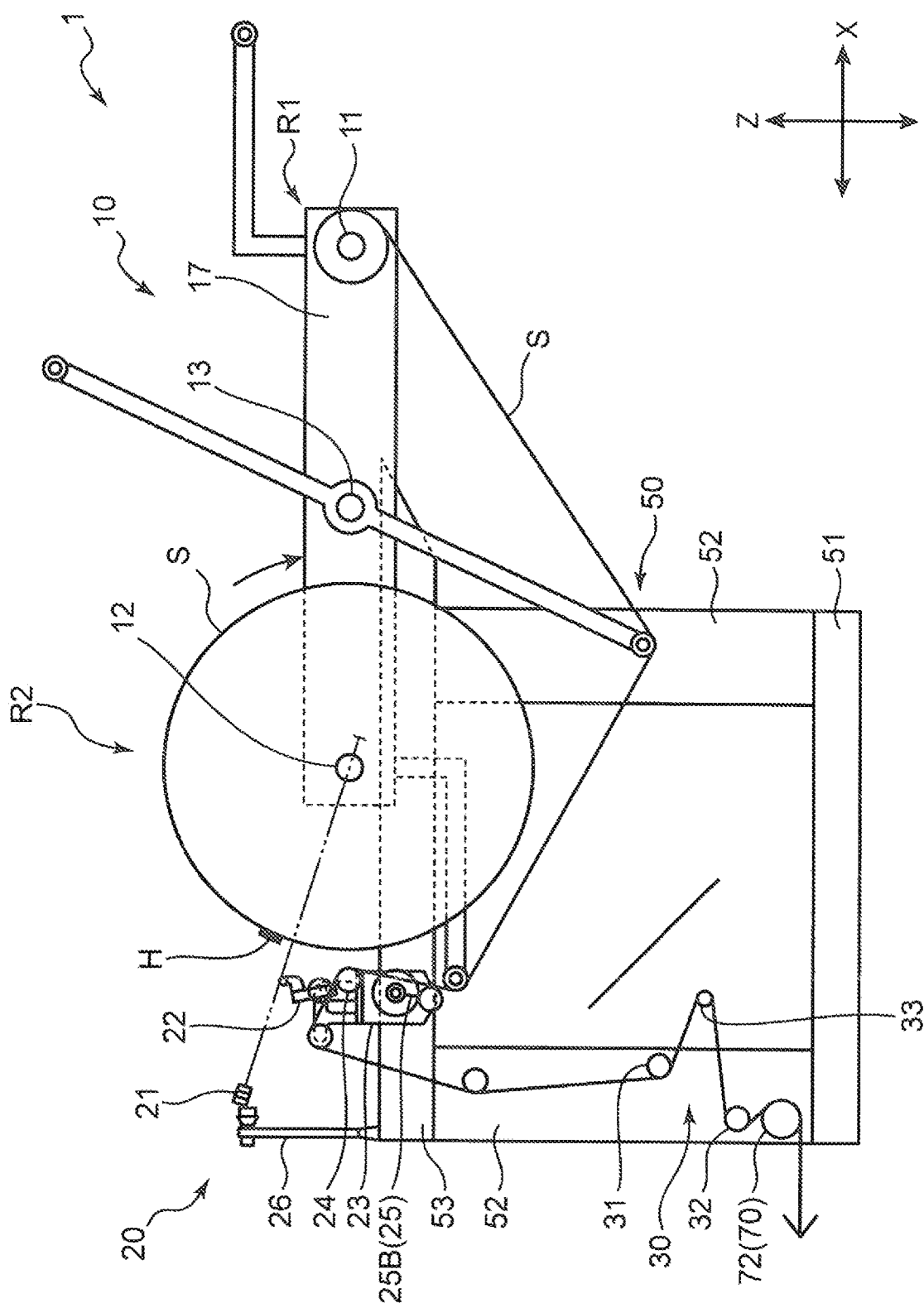
FIG. 1 is a partial cross-sectional front view schematically showing a configuration of a sheet supply apparatus according to an embodiment of the present invention.
Figure 2:
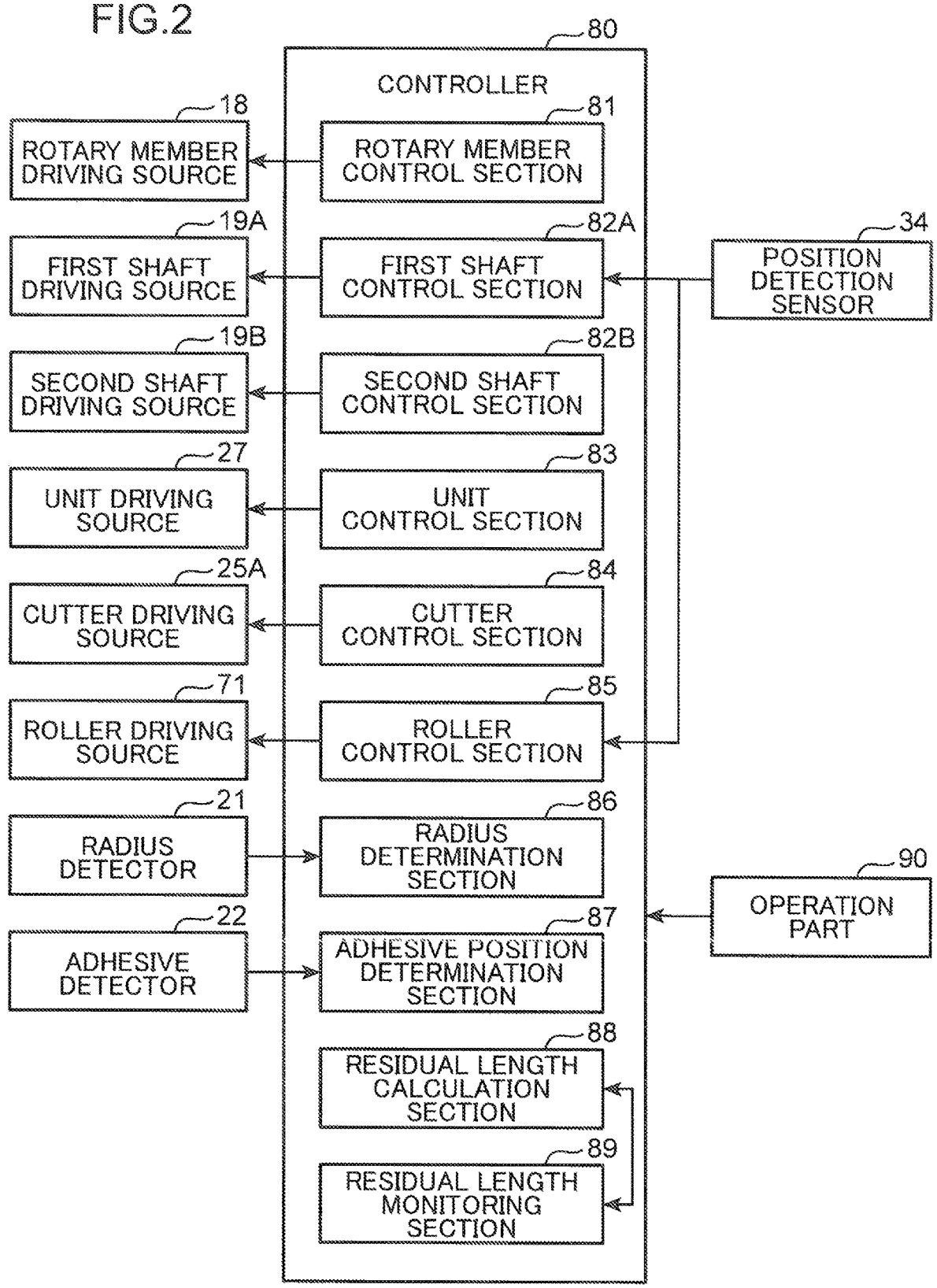
FIG. 2 is a block diagram showing an electrical configuration of a controller which controls operations of the sheet supply apparatus.

FIG. 1 is a partial cross-sectional front view of a sheet supply apparatus 1. FIG. 2 is a block diagram showing an electrical configuration of a controller 80 which controls operations of the sheet supply apparatus 1. Hereinafter, a lateral direction in FIG. 1 is defined as an "X direction", a vertical direction in FIG. 1 is defined as a "Z direction", and a direction (i.e., a depth direction of the paper sheet in FIG. 1) perpendicularly intersecting the X and Z directions is defined as a "Y direction".

The sheet supply apparatus 1 is an apparatus for sequentially unwinding a sheet S from a first roll R1 of sheet S and a second roll R2 of sheet S. As shown in FIG. 1, the sheet supply apparatus 1 includes a base 50, a support mechanism 10, a joining mechanism 20, a drive part 70, a tension adjusting mechanism 30, and a controller 80. The support mechanism 10 is mounted on the base 50, and supports the first and second rolls R1, R2. The joining mechanism 20 is attached to the base 50 and joins the sheet run from the first roll R1 to the sheet S of the second roll R2. The drive part 70 supplies the sheet S run from the first roll R1 or the second roll R2 to a downstream location of the sheet supply apparatus 1. The tension adjusting mechanism 30 serves as a control mechanism which executes a feedback control via the controller 80 so that the sheet S is unwound from the first roll R1 or the second roll R2 at a predetermined running speed by detecting a tension of the sheet S at an upstream position of the drive part 70 and regulating a supply speed of the sheet depending on the tension. The controller 80 controls the support mechanism 10 and the joining mechanism 20.

In FIG. 1, the first roll R1 is in a supply state of supplying the sheet S, and the second roll R2 is in a standby state of suspending supply of the sheet S. The sheet supply apparatus 1 can continuously supply the sheet S to a line in a downstream location of the sheet supply apparatus 1 by permitting the joining mechanism 20 to join the sheet S of the second roll R2 (the standby roll) and the sheet S of the first roll R1 (the supply roll) to each other, and to cut the sheet S run from the first roll R1 at an upstream position of a joining portion where the sheets S have been joined to each other. After the joining mechanism 20 performs the joining operation, the controller 80 sets a new roll to be mounted onto a first support shaft 11 as a next standby roll in place of the first roll R1 whose sheet has been cut, and further sets the second roll R2 from which the sheet supply is started as a next supply roll. The roll setting shift is repeatedly executed in this manner at every time when the joining mechanism 20 performs the joining operation.

As shown in FIG. 1, the second roll R2 has an outer peripheral surface provided with an adhesive H (e.g., a double-sided tape) to adhere the sheet S of the second roll R2 and the sheet S of the first roll R1 to each other. Structural elements of the sheet supply apparatus 1 will be described below.

The base 50 includes a mount plate 51 placed on a predetermined setting surface, a plurality of pillars 52 extending in the Z direction, and a beam 53 extending in the X direction. As shown in FIG. 1, the pillars 52 stand on the mount plate 51 to face each other in the X direction. The beam 53 has the opposite ends which are fixedly attached to corresponding upper ends of the pillars 52.

The support mechanism 10 is attached to the base 50 rotatably about a rotary shaft 13 extending in the Y direction. Specifically, the support mechanism 10 includes the rotary shaft 13, a rotary member 17 which is rotatable about the rotary shaft 13, and the first support shaft 11 and a second support shaft 12 provided to the rotary member 17 for rotatably supporting the first and second rolls R1, R2 at their respective center positions.

The rotary member 17 extends in a direction orthogonal to the rotary shaft 13. The first support shaft 11 is provided at one end portion of the rotary member 17 that is on one side with respect to the rotary shaft 13, and the second support shaft 12 is provided at the other end portion of the rotary member 17 that is on the other side with respect to the rotary shaft 13. The first and second support shafts 11, 12 are supported on the rotary member 17 by one end thereof and extend in the Y direction (forward of the paper sheet). In this configuration, the first and second rolls R1, R2 can be mounted onto the support mechanism 10 by inserting the first and second support shafts 11, 12 through the centers of the first and second rolls R1, R2 from their respective free ends.

As shown in FIG. 2, the support mechanism 10 further includes a rotary member driving source 18, a first shaft driving source 19A, and a second shaft driving source 19B. The rotary member driving source 18 generates a drive force to rotate the rotary member 17. The first shaft driving source 19A generates a drive force to rotate the first support shaft 11 around its axis. The second shaft driving source 19B generates a drive force to drive the second support shaft 12 around its axis. Each of the rotary member driving source 18, the first shaft driving source 19A, and the second shaft driving source 19B includes, for example, a motor. The rotary drive force of the motor is transmitted to the rotary shaft 13, and the first and second support shafts 11, 12 via a power transmission mechanism including a belt and a pulley. Consequently, the rotary shaft 13, and the first and the second support shafts 11, 12 can rotate around respective axes at a predetermined speed.

Meanwhile, although unillustrated, the rotary member 17 can be held in any posture in an ordinary operation where the sheet S is supplied to the line in the downstream location. For instance, the rotary member 17 may be held in a posture such that the first roll R1 (the supply roll) is at a higher position and closer to the joining mechanism 20 than the second roll R2 (the standby roll) in the Z direction. Further, when joining the respective sheets S of the first and second rolls R1, R2 to each other, the rotary member 17 is caused to rotate about the rotary shaft 13 to move the second or standby roll R2 closer to the joining mechanism 20 as shown in FIG. 1 (to reach a splice position).

The joining mechanism 20 includes a joining unit 23, a unit driving source 27 (FIG. 2), a pressing roller 24, a cutter 25, a radius detector 21, and an adhesive detector 22. The joining unit 23 is movable in the X direction along the beam 53. The unit driving source 27 generates a drive force to move the joining unit 23. The pressing roller 24 presses an intermediate portion of the sheet S run from the first roll R1 onto the outer peripheral surface of the second roll R2 toward the center of the second roll R2. The cutter 25 cuts the sheet S run from the first roll R1. The radius detector 21 detects a distance (a radius, specifically, a radius of the second roll R2) from the center of the second roll R2 to the outer peripheral surface thereof. The adhesive detector 22 detects a circumferential position of the adhesive H provided on the outer peripheral surface of the second roll R2 in the rotational direction of the second roll R2.

Figure 3:
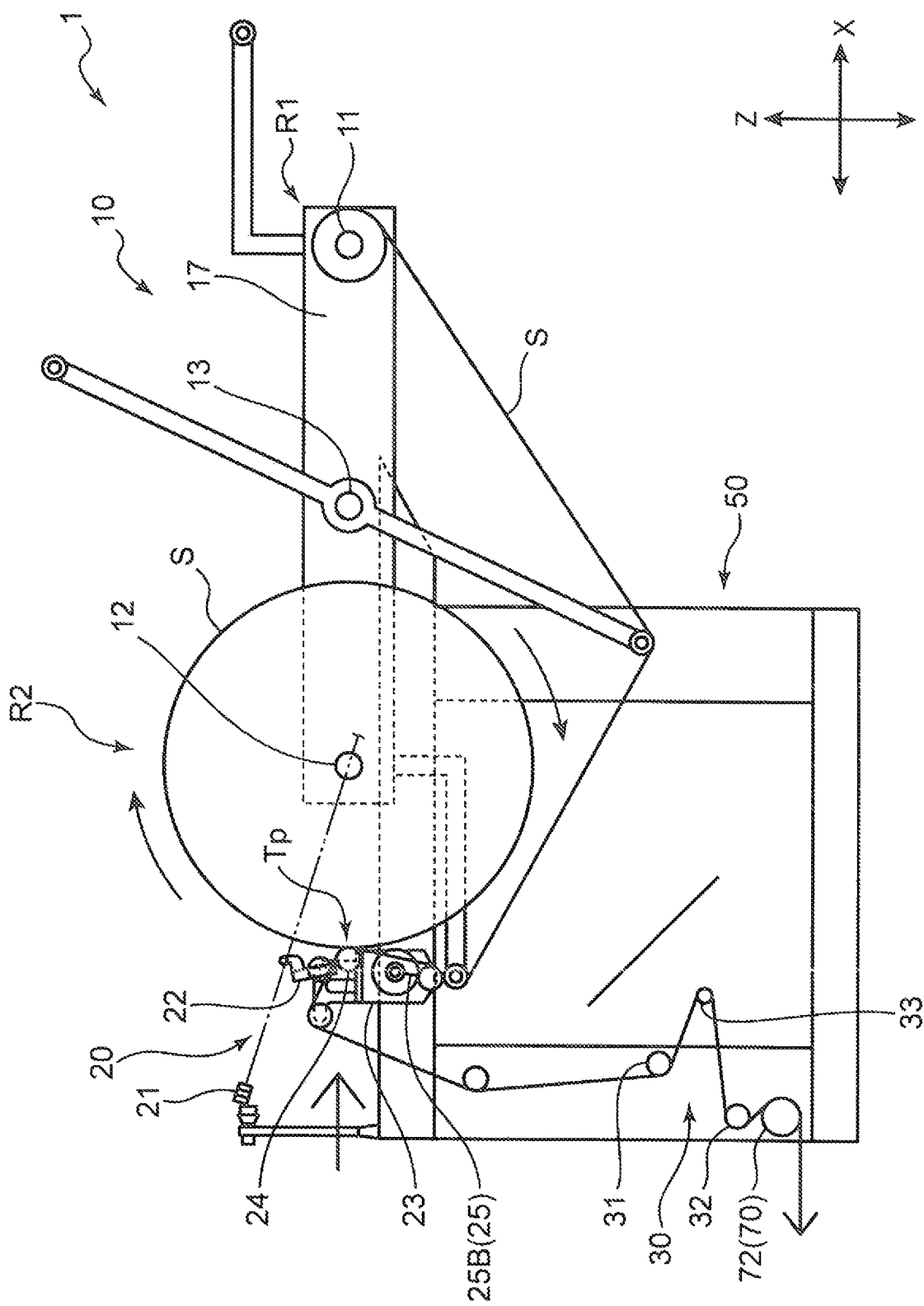
FIG. 3 is a schematic view showing a state where a sheet of a first roll is pressed onto an outer peripheral surface of a second roll in a joining mechanism provided in the sheet supply apparatus.
Figure 4:
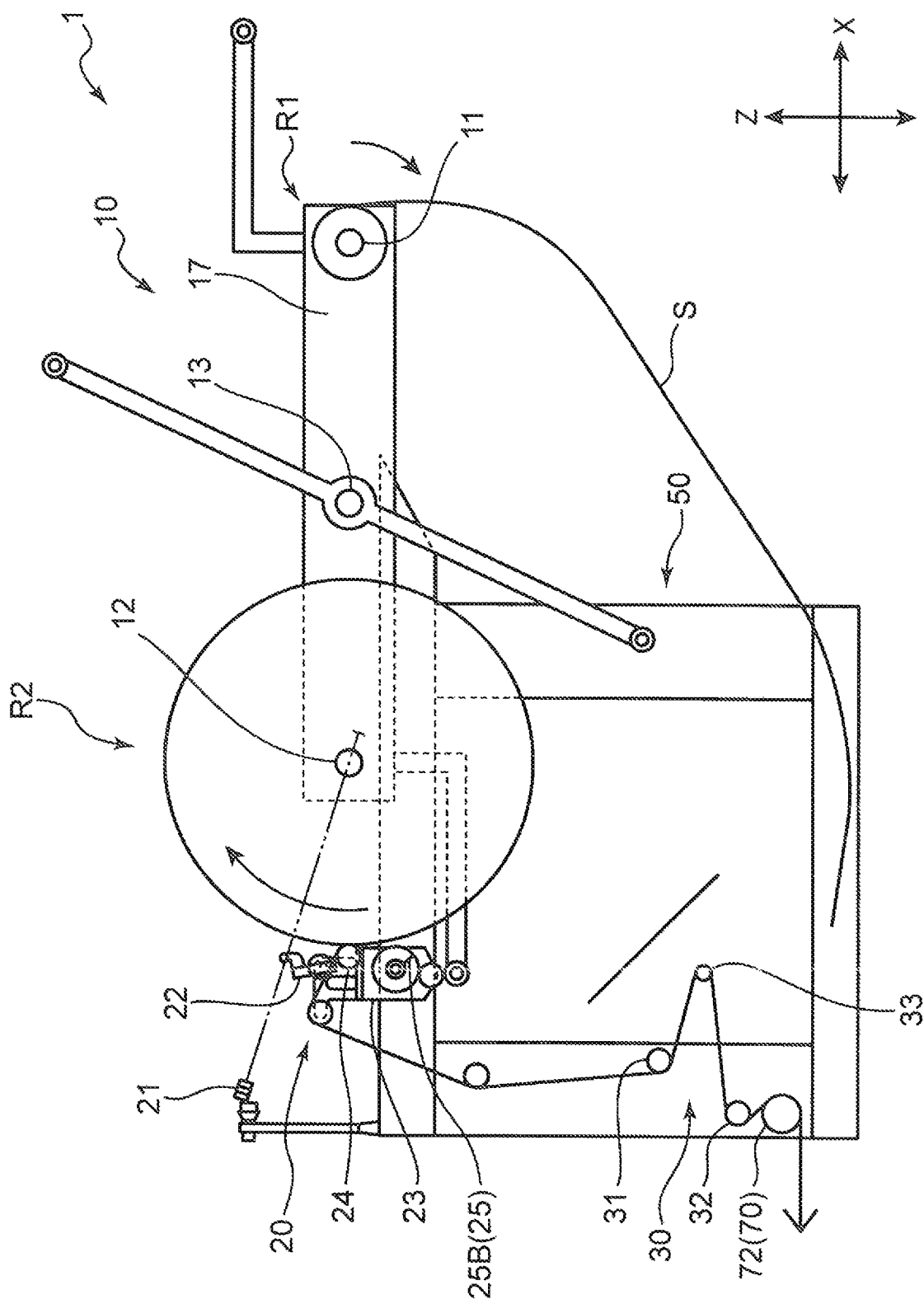
FIG. 4 is a schematic view showing a state where the sheet of the first roll is cut in the joining mechanism.
Figure 5:
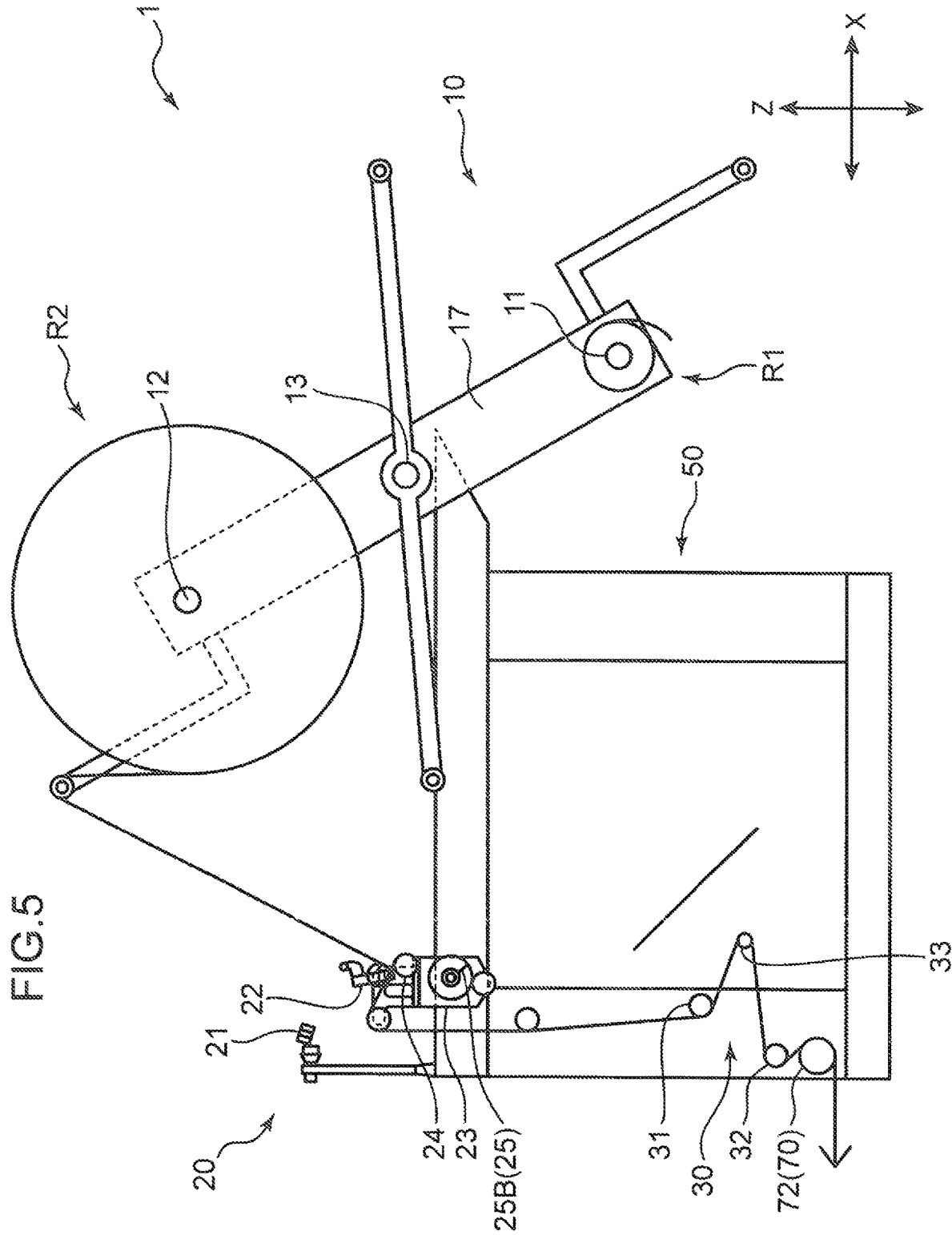
FIG. 5 is a schematic view showing a state where the sheet of the first roll is wound up in the joining mechanism.

The configuration of the joining mechanism 20 will be described with reference to FIGS. 3 to 5 in addition to FIGS. 1 and 2. FIG. 3 is a schematic view showing a state where the sheet S of the first roll R1 is pressed onto the outer peripheral surface of the second roll R2 in the joining mechanism 20. FIG. 4 is a schematic view showing a state where the sheet S of the first roll R1 is cut in the joining mechanism 20. FIG. 5 is a schematic view showing a state where the sheet S of the first roll R1 is wound up in the joining mechanism 20.

The unit driving source 27 includes, for example, a servomotor, and the drive force thereof is transmitted to the joining unit 23 via a power transmission mechanism including a belt and a pulley. Owing to the transmitted drive force, it is possible to move the joining unit 23 forward to be closer to the second roll R2 at the splice position and backward to be away from the second roll R2.

The pressing roller 24 has an axis extending in the Y direction, and is attached to the joining unit 23. Hence, the pressing roller 24 shifts forward and backward together with the joining unit 23 while kept in parallel to the axis of the second roll R2. This configuration achieves a joining operation of joining the sheets S via the adhesive H by causing the pressing roller 24 to press the intermediate portion of the sheet S run from the first roll R1 onto the outer peripheral surface of the second roll R2. In other words, the joining mechanism 20 performs the joining operation of joining the respective sheets S of the first roll R1 and the second roll R2 to each other by causing the pressing roller 24 to perform the pressing operation of pressing the sheet S run from the first roll R1 rotating in association with the rotation of the first support shaft 11 to the adhesive H provided on the outer peripheral surface of the second roll R2 rotating in association with the rotation of the second support shaft 12 (see FIG. 3).

The cutter 25 has a cutter blade 25B rotatable about an axis extending in the Y direction, and a cutter driving source 25A (FIG. 2) which generates a drive force to rotate the cutter blade 25B. The cutter 25 is also attached to the joining unit 23, and thus shifts forward and backward together with the joining unit 23. The cutter 25 can cut the sheet S run from the first roll R1 at an upstream position of the joining portion where the sheets S have been joined to each other after the joining operation (see FIG. 4). After the cutter 25 cuts the sheet S of the first roll R1 after the joining operation, the first roll R1 is reversely rotated to wind up the portion of the sheet S that is upstream of the cutting position (see FIG. 5).

The radius detector 21 includes, for example, a laser sensor. As shown in FIG. 1, the radius detector 21 is fixedly held at a higher position than the joining unit 23 via a bracket 26 standing on the beam 53.

The adhesive detector 22 includes, for example, a color sensor (a line sensor or an area sensor). The adhesive detector 22 is further attached to the joining unit 23, and thus shifts forward and backward together with the joining unit 23.

The drive part 70 is arranged at a most downstream position in a sheet conveyance direction in the sheet supply apparatus 1. The drive part 70 includes a driving roller 72 having an axis extending in the Y direction so as to support the sheet S, and a roller driving source 71 (FIG. 2) which generates a drive force to rotate the driving roller 72 around the axis at a predetermined speed. The roller driving source 71 includes, for example, a motor. A conveyance speed is regulated to supply the sheet S to the line in the downstream location at a predetermined conveyance speed by adjusting the rotational speed of the driving roller 72 via the output from the roller driving source 71. In this case, the rotational speed of the first support shaft 11 is regulated so that the sheet S is unwound from the first roll R1 at a predetermined running speed.

The tension adjusting mechanism 30 is provided between the joining unit 23 and the driving roller 72 in the sheet conveyance direction. The tension adjusting mechanism 30 executes a feedback control via the controller 80 so that the sheet S is unwound from the first roll R1 at the predetermined running speed. As shown in FIG. 1, the tension adjusting mechanism 30 has a pair of fixed rollers 31, 32, and a movable roller 33 which is disposed between the pair of fixed rollers 31, 32 and moved depending on a tension of the sheet S. The sheet S run from the first roll R1 can be supported on the fixed rollers 31, 32, and the movable roller 33. When the tension of the sheet S is lower than a predetermined set value, the movable roller 33 is moved to increase a path length of the sheet S. Conversely, when the tension of the sheet is higher than the set value, the movable roller 33 is moved to decrease the path length of the sheet S.

The tension adjusting mechanism 30 further includes a position detection sensor 34 (FIG. 2) for detecting the position of the movable roller 33. A result of the detection obtained by the position detection sensor 34 is sent to the controller 80. The controller 80 regulates the rotational speed of the first support shaft 11 based on the detection result. In other words, positional information of the movable roller 33 is fed back for the rotation control of the first support shaft 11. Owing to the feedback, the tension is changed to place the movable roller 33 at a predetermined setting position by adjusting the supply speed of the sheet S run from the first roll R1 by way of acceleration or deceleration. This consequently makes it possible to regulate the rotational speed of the first support shaft 11 so that the sheet S is unwound from the first roll R1 at the predetermined running speed.

The controller 80 includes a CPU (Central Processing Unit), a RAM (Random Access Memory), a ROM (Read Only Memory) and the like in combination. The controller 80 controls the support mechanism 10 and the joining mechanism 20 when the residual length of the sheet S of the first roll R1 reaches a predetermined residual length or shorter in the state where the sheet S is supplied from the first roll R1 (supply roll). Specifically, the controller 80 controls the support mechanism 10 and the joining mechanism 20 so that a target joining portion of the sheet S run from the first roll R1 is joined to the adhesive H on the outer peripheral surface of the second roll R2. The target joining portion of the sheet S of the first roll R1 represents a portion to be joined to the adhesive H on the second roll R2 where a residual length of the sheet S of the first roll R1 reaches a predetermined target residual wound length.

As shown in FIG. 2, the controller 80 includes a rotary member control section 81, a first shaft control section 82A, a second shaft control section 82B, a unit control section 83, a cutter control section 84, a roller control section 85, a radius determination section 86, an adhesive position determination section 87, a residual length calculation section 88, and a residual length monitoring section 89.

The rotary member control section 81 controls rotation and stop of the motor constituting the rotary member driving source 18. Thus, the rotation of the rotary member 17 about the rotary shaft 13 is controlled. The first shaft control section 82A controls rotation and stop of the motor constituting the first shaft driving source 19A. In this way, the rotation of the first support shaft 11 supporting the first roll R1 is controlled. The second shaft control section 82B controls rotation and stop of the motor constituting the second shaft driving source 19B. In this way, the rotation of the second support shaft 12 supporting the second roll R2 is controlled. The unit control section 83 controls drive and rotation of the servomotor constituting the unit driving source 27. Consequently, the joining unit 23 is controlled to move closer to or away from the second roll R2 at the splice position.

The cutter control section 84 controls the drive of the cutter driving source 25A. Hence, the rotation of the cutter blade 25B of the cutter 25 is controlled. The roller control section 85 controls rotation and stop of the motor constituting the roller driving source 71. In this way, the rotation of the driving roller 72 is controlled.

The radius determination section 86 determines radiuses of the second roll R2 at a plurality of locations in the rotational direction of the second roll R2 based on the detection result from the radius detector 21 in a state where the second roll R2 (the standby roll) is rotated in association with the rotation of the second support shaft 12 owing to the second shaft driving source 19B, and further determines a mean radius of the second roll R2 based on the determined radiuses. The adhesive position determination section 87 determines a circumferential position of the adhesive H on the outer peripheral surface of the second roll R2 (the standby roll) based on the detection result from the adhesive detector 22.

The residual length calculation section 88 calculates the residual length of the sheet S of the first roll R1 in a state where the sheet S is unwound from the first roll R1 (the supply roll) rotating in association with the rotation of the first support shaft 11 at the predetermined running speed. Specifically, the residual length calculation section 88 calculates a radius of the first roll R1 based on the running speed of the sheet S of the first roll R1, and a rotational speed of the first support shaft 11. Furthermore, the residual length calculation section 88 calculates a sheet thickness of the sheet S unwound from the first roll R1 in accordance with a reduction in the radius of the first roll R1 for each rotation thereof. Moreover, the residual length calculation section 88 calculates the residual length of the sheet S of the first roll R1 based on the radius of the first roll R1 and the sheet thickness of the sheet S.

The residual length monitoring section 89 monitors the residual length of the sheet S of the first roll R1 calculated by the residual length calculation section 88, and outputs a control instructive signal for instructing rotation control for each of the first support shaft 11 and the second support shaft 12 to the first shaft control section 82A and the second shaft control section 82B in accordance with the residual length of the sheet. The operation of the residual length monitoring section 89 will be described in detail later.

The controller 80 executes controls described below in the ordinary operation where the sheet is supplied to the downstream location, and in the sheet joining. First, for the sheet supply in the ordinary operation, the controller 80 (the first shaft control section 82A and the roller control section 85) controls the first support shaft 11 and the drive part 70 to supply the sheet S of the first roll R1 (the supply roll) from the drive part 70 to the downstream location at the predetermined conveyance speed set for the line in the downstream location. At this time, the controller 80 controls the first support shaft 11 by using the feedback from the tension adjusting mechanism 30 so that the running speed of the sheet S unwound from the first roll R1 coincides with the supply speed of the sheet S from the drive part 70.

Further, in the sheet joining where the residual length of the sheet S of the first roll R1 reaches the predetermined residual length or shorter, the controller 80 (the first shaft control section 82A, the second shaft control section 82B, and the unit control section 83) controls the first support shaft 11, the second support shaft 12, and the joining mechanism 20 so that the target joining portion of the sheet S run from the first roll R1 is joined to the adhesive H on the outer peripheral surface of the second roll R2 by causing the pressing roller 24 in the joining mechanism 20 to perform the pressing operation, the residual length of the sheet of the first roll R1 reaching a predetermined target residual wound length at the target joining portion.

Figure 7A:
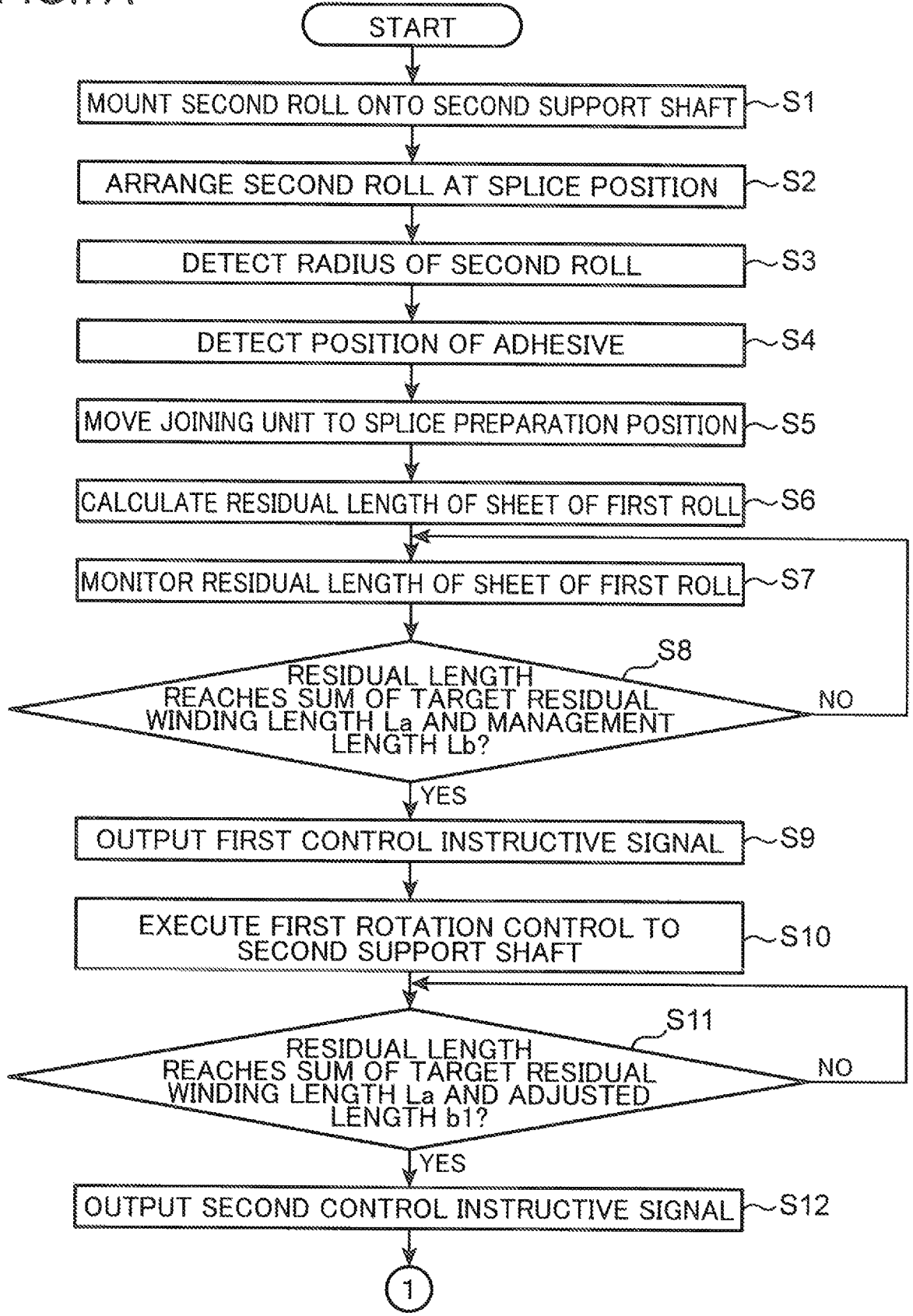
FIG. 7A is a flowchart showing a sequence of the processing executed by the controller.
Figure 7B:
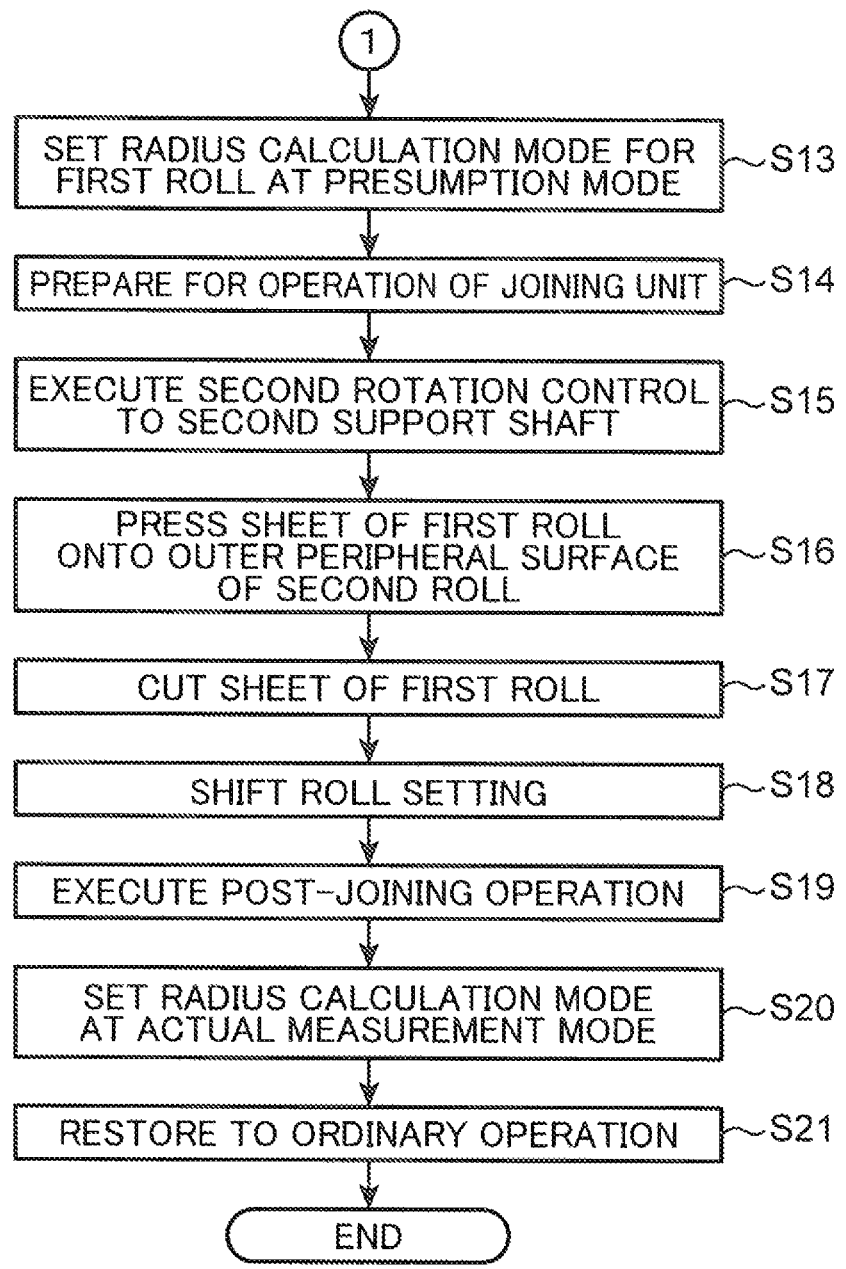
FIG. 7B is a flowchart showing another sequence of the processing executed by the controller.

Hereinafter, a sheet supply method will be described in accordance with a sequence of a processing executed by the controller 80 in the sheet joining with reference to FIGS. 6A, 613, 7A, and 7B. FIG. 6A is a view schematically showing a state where the sheet S of the first roll R1 is unwound from the first roll R1. FIG. 6B is a view explaining a processing of controlling rotation of the second support shaft 12 to be executed by the controller. 80. Each of FIGS. 7A and 7B is a flowchart showing a sequence of the processing executed by the controller 80. Described below is a case where a current sheet is supplied from the first roll R1 supported on the first support shaft 11, and a new second roll R2 is mounted onto the second support shaft 12, i.e., a case where the first roll R1 serves as the supply roll, and the second roll R2 serves as the standby roll.

A sheet supply step is executed in the ordinary operation where the sheet S is supplied from the first roll R1 to the line in the downstream location prior to the execution of the sheet joining operation. In the sheet supply step, the controller 80 (the first shaft control section 82A, the roller control section 85) controls the first support shaft 11 and the drive part 70 so that the sheet S is unwound from the first roll R1 at the predetermined running speed. Besides, in the sheet supply step, the controller 80 (the first shaft control section 82A) calculates the radius of the first roll R1 based on the conveyance length of the sheet S in the line for each rotation of the first roll R1. A calculation mode for the radius of the first roll R1 is referred to as an "actual measurement mode". The controller 80 (the first shaft control section 82A) regulates the rotational speed of the first support shaft 11 based on the radius of the first roll R1 calculated in the actual measurement mode, and the detection result from the position detection sensor 34 concerning the position of the movable roller 33 in the tension adjusting mechanism 30. In the "actual measurement mode", the controller 80 calculates the radius of the first roll R1 based on the conveyance length of the sheet S for each rotation of the first roll R1, and regulates the rotational speed of the first support shaft 11 based on the calculation result. When an erroneous difference occurs between the regulated running speed of the sheet S from the first roll R1 and the supply speed of the sheet S from the drive part 70, a part of the erroneous difference is absorbed by way of the feedback control of the tension adjusting mechanism 30.

In the sheet supply step, a target residual wound length La and a management length Lb concerning the residual length of the sheet S of the first roll R1 are set in response to an operation of input performed by an operator to an operation part 90 (see FIG. 6A). The target residual wound length La of the sheet S of the first roll R1 represents a target value of the residual length of the sheet S of the first roll R1 after the respective sheets S of the first roll R1 and the second roll R2 are joined to each other.

The management length Lb of the sheet S of the first roll R1 is set at a combination of an adjusted length Lb1 and a peripheral speed regulating length Lb2. The peripheral speed regulating length Lb2 represents a conveyance length of the sheet S of the first roll R1 that is presumed to be supplied under a first rotation control executed by the second shaft control section 82B to the second support shaft 12, which will be described in detail later. Although described in detail later, the rotational speed of the second support shaft 12 is regulated so that the peripheral speed of the second roll R2 coincides with the running speed of the sheet S of the first roll R1 under the first rotation control executed by the second shaft control section 82B. The adjusted length Lb1 represents a conveyance length of the sheet S of the first roll R1 that is presumed to be supplied under a second rotation control executed by the second shaft control section 82B to the second support shaft 12, which will be described in detail later. Although described in detail later, the rotational speed of the second support shaft 12 is regulated by way of acceleration or deceleration under the second rotation control executed by the second shaft control section 82B. The management length Lb that is the combination of the adjusted length Lb1 and the peripheral speed regulating length Lb2 is set at, for example, 75 m. The adjusted length Lb1 is set at, for example, 10 m to 50 m, specifically, at 25.4 m.

In response to an operation performed by the operator to the operation part 90 for causing the sheet supply apparatus 1 to execute the joining operation, the controller 80 (the rotary member control section 81) controls the rotation of the rotary member 17 so that the second support shaft 12 is moved to a mount position opposite to a splice position where the second support shaft 12 moves closer to the joining mechanism 20 (step S1). In this manner, the operator mounts the second roll R2 onto the second support shaft 12 disposed at the mount position.

After mounting the second roll R2 onto the second support shaft 12, the operator performs another operation of input to indicate finish of the mounting to the operation part 90. In response, the controller 80 (the rotary member control section 81) controls the rotation of the rotary member 17 so that the second support shaft 12 is moved to the splice position where the second support shaft 12 is closer to the joining mechanism 20 (step S2).

After the second support shaft 12 supporting the second roll R2 is moved to the splice position, the controller 80 (the second shaft control section 82B) rotates the second roll R2 by rotating the second support shaft 12. In this state, the radius detector 21 starts to detect the radiuses of the second roll R2 (step S3). After the radius detector 21 detects distances of the second roll R2 (radiuses, specifically, radiuses of the second roll R2) from a roll center to a plurality of locations in a circumferential direction of the second roll R2 for each rotation of the second roll R2, the controller 80 (the second shaft control section 82B) stops the rotation of the second support shaft 12.

After the radiuses to the plurality of locations in the circumferential direction of the second roll R2 are detected, the controller 80 (the unit control section 83) causes the joining unit 23 mounted with the adhesive detector 22 to move closer to a position at a predetermined distance from the maximal radius. Thereafter, the controller 80 (the second shall control section 82B) rotates the second roll R2 by rotating the second support shaft 12. In this state, the adhesive detector 22 detects the position of the adhesive H on the outer peripheral surface of the second roll R2 (step S4). The controller 80 (the adhesive position determination section 87) then determines the position of the adhesive H on the outer peripheral surface of the second roll R2 in the circumferential direction of the second roll R2, that is, determines the position in the rotational direction with respect to the second support shaft 12, based on the detection result from the adhesive detector 22. The controller 80 (the second shaft control section 82B) stops the rotation of the second support shaft 12 so that the adhesive H moves to a predetermined position in the rotational direction of the second roll R2 based on the determined position of the adhesive H.

Subsequently, the controller 80 (the unit control section 83) moves the joining unit 23 to a splice preparation position (step S5). The splice preparation position is set in such a manner that the pressing roller 24 is kept away from the second roll R2 without coming into contact therewith irrespective of difference in the radiuses of the second roll R2 in the rotational direction thereof.

Next, the controller 80 (the residual length calculation section 88) calculates the residual length of the sheet S of the first roll R1 in a state where the sheet S is unwound from the first roll R1 at a predetermined running speed (residual length calculation step S6). Here, the controller 80 (the residual length calculation section 88) calculates the residual length of the sheet S of the first roll R1 based on the radius of the first roll R1 and the sheet thickness each changing in accordance with the supply of the sheet S from the first roll R1, as described above. The calculation of the residual length of the sheet S of the first roll R1 is continuously executed for each rotation of the first support shaft 11.

The controller 80 (the residual length monitoring section 89) monitors the residual length of the sheet S of the first roll R1 calculated for each rotation of the first support shaft 11 (residual length monitoring step S7). The monitoring of the residual length of the sheet S of the first roll R1 is also continuously executed for each rotation of the first support shaft 11 in the same manner as the calculation of the sheet residual length.

The controller 80 (the residual length monitoring section 89) determines whether the residual length of the sheet S of the first roll R1 reaches a first watch residual length (the target residual wound length La+the management length Lb) that is a sum of the management length Lb and the target residual wound length La (step S8). When determining that the residual length reaches the first watch residual length, the controller 80 (the residual length monitoring section 89) outputs a first control instructive signal for instructing rotation control for the second support shaft 12 (step S9, see FIG. 6A).

In response to the output first control instructive signal, the controller 80 (the second shaft control section 82B) executes the first rotation control to the second support shaft 12 by starting the rotation of the second support shaft 12 supporting the second roll R2 (first rotational speed regulation step S10). The controller 80 (the second shaft control section 82B) starts the rotation of the second support shaft 12, and regulates the rotational speed of the second support shaft 12 in accordance with the mean radius of the second roll R2 based on the detection result from the radius detector 21 so that the peripheral speed of the second roll R2 coincides with the running speed of the sheet S of the first roll R1 under the first rotation control. This leads to the supply of the sheet S from the first roll R1 by a length corresponding to the peripheral speed regulating length Lb2 during a period of time until the peripheral speed of the second roll R2 reaches the running speed of the sheet S of the first roll R1 after the rotation of the second support shaft 12 is started.

After outputting the first control instructive signal, the controller 80 (the residual length monitoring section 89) determines whether the residual length of the sheet S of the first roll R1 reaches a second watch residual length (the target residual wound length La+the adjusted length Lb1) that is a sum of the adjusted length Lb1 (a predetermined length) and the target residual wound length La (step S11). When determining that the residual length reaches the second watch residual length, the controller 80 (the residual length monitoring section 89) outputs a second control instructive signal for instructing the rotation control for each of the first support shaft 11 and the second support shaft 12 (step S12, see FIG. 6A).

Steps S13, S14, and S15 are executed after the second control instructive signal is output in the step S12.

In the step S13, the controller 80 (the first shaft control section 82A) shifts the setting of the calculation mode for the radius of the first roll R1 from the "actual measurement mode" to a "presumption mode", and regulates the rotational speed of the first support shaft 11 based on a presumed radius value calculated in the "presumption mode" so that the running speed of the sheet S from the first roll R1 is constant. The "presumption mode" represents a radius calculation mode where a radius of the first roll R1 that changes each rotation of the first roll R1 is calculated and presumed based on its change caused by the supply of the sheet S from R1, and a presumed radius value obtained by the presumption is set as a radius for regulating the rotational speed of the first support shaft, the change caused by the supply of the sheet S having been referred to in the residual length calculation step S6 and the residual length monitoring step S7 of calculating the residual length of the sheet of the first roll R1. Specifically, the controller 80 (the first shaft control section 82A) controls, in the step S13, the rotation of the first support shaft 11 by shifting from the control: using the radius of the first roll R1 (i.e., the radius based on the conveyance length of the sheet S for each rotation of the first roll R1) calculated in the "actual measurement mode"; and based on the detection result from the position detection sensor 34 to the control using the presumed radius value of the first roll R1 calculated in the "presumption mode". The controller 80 (the first shaft control section 82A) then regulates the rotational speed of the first support shaft 11 so that the running speed of the sheet S from the first roll R1 is constant by using the presumed radius value calculated in the "presumption mode". The rotational speed of the first support shaft 11 is regulated based on the presumed radius value of the first roll R1 calculated in the "presumption mode" during a period of time from the step S13 executed after the second control instructive signal is output to the step S19 in which the joining mechanism 20 performs the joining operation. Here, the feedback control of the tension adjusting mechanism 30 is executed for the control of regulating the rotational speed of the first support shaft 11 based on the presumed radius value of the first roll R1 calculated in the "presumption mode" in the same manner as the regulation in the "actual calculation mode". The feedback control of the tension adjusting mechanism 30 achieves a smaller erroneous difference between the running speed of the sheet S from the first roll R1 and the supply speed of the sheet S at the drive part 70.

In the step S14, the controller 80 (the unit control section 83, the cutter control section 84) executes preparation for operating the joining unit 23. Specifically, the controller 80 (the unit control section 83) sets a time for moving the joining unit 23 so that the pressing roller 24 performs the pressing operation. Additionally, the controller 80 (the cutter control section 84) sets a time for controlling the cutter blade 25B of the cutter 25 to rotate at a time when the pressing roller 24 performs the pressing operation.

In the step S15, the controller 80 (the second shaft control section 82B) executes the second rotation control to the second support shaft 12 supporting the second roll R2 subsequent to the first rotation control (second rotation speed regulating step). Under the second rotation control subsequent to the first rotation control, the controller 80 (the second shaft control section 82B) regulates the rotational speed of the second support shaft 12 by way of acceleration or deceleration so that the adhesive H on the outer peripheral surface of the second roll R2 arrives at a pressing position Tp where the pressing roller 24 in the joining mechanism 20 performs the pressing operation when a target joining portion Tr of the sheet S run from the first roll R1 meets the pressing position Tp, and the peripheral speed of the second roll R2 coincides with the running speed of the sheet S of the first roll R1, the residual length of the sheet S of the first roll R1 reaching the target residual wound length La at the target joining portion Tr. (see FIG. 6).

As shown in FIG. 6B, a target residual wound length position Tm where the residual length of the sheet S of the first roll R1 reaches the target residual wound length La agrees with an unwinding start position Ts of the first roll R1. Besides, the target joining portion Tr of the sheet S of the first roll R1 is downstream of the target residual wound length position Tm at a distance of a predetermined reference length LL. The reference length LL corresponds to a path length from the unwinding start position Ts of the first roll R1 to the pressing position Tp, and is substantially uniform.

At the start of the second rotation control, the adhesive H locates at any circumferential position of the second roll R2 on the outer peripheral surface thereof. The circumferential position of the adhesive H is understood from its position in the rotational direction with respect to the second support shaft 12 as detected by the adhesive detector 22. Moreover, the rotational speed of the second support shaft 12 is maintained in the case where the adhesive H in the rotational direction of the second roll R2 arrives at the pressing position Tp when the target joining portion Tr of the sheet S of the first roll R1 meets the pressing position Tp in the state where the peripheral speed of the second roll R2 coincides with the running speed of the sheet S of the first roll R1. When a distance between the pressing position Tp and the adhesive H at a downstream position in the rotational direction of the second roll R2 equals to or shorter than a semicircle of the second roll R2, the rotation of the second support shaft 12 is decelerated. When the distance between the pressing position Tp and the adhesive H at the downstream position in the rotational direction of the second roll R2 is longer than the semicircle of the second roll R2, the rotation of the second support shaft 12 is accelerated. The rotational speed of the second support shaft 12 is restored and maintained such that the peripheral speed of the second support shaft 12 coincides with the running speed of the sheet S of the first roll R1 when the adhesive H arrives at the pressing position Tp and the target joining portion Tr of the sheet S of the first roll R1 meets the pressing position Tp owing to the acceleration or deceleration. The rotational speed regulation by way of the acceleration or deceleration may be executed for a plurality of times until the target joining portion Tr meets the pressing position Tp.

As shown in FIG. 6B, the controller 80 (the unit control section 83) moves the joining unit 23 to cause the pressing roller 24 to perform the pressing operation when the target joining portion Tr of the sheet S of the first roll R1 meets the pressing position Tp and the adhesive H on the outer peripheral surface of the second roll R2 arrives at the pressing position Tp at the same time (joining processing step S16). Consequently, the target joining portion Tr of the sheet S of the first roll R1 is joined to the adhesive H on the outer peripheral surface of the second roll R2.

The controller 80 (the cutter control section 84) further rotates the cutter blade 25B of the cutter 25 at a time when the pressing roller 24 performs the pressing operation (step S17), thereby cutting the sheet S from the first roll R1. After the sheet S is cut from the first roll R1, supply of the sheet S from the second roll R2 is started. At this time, the controller 80 shifts the roll setting (step S18). Specifically, the controller 80 sets a new roll mounted onto the first support shaft 11 as a next standby roll in place of the first roll R1 whose sheet has been cut, and sets the second roll R2 from which the sheet supply is started as a next supply roll.

Subsequently, the controller 80 (the first shaft control section 82A, the unit control section 83) executes a post-operation after the joining operation (step S19). Specifically, the controller 80 (the unit control section 83) moves the joining unit 23 backward. The controller 80 (the first shaft control section 82A) then winds up a portion of the sheet S that is upstream of the cutting position by reversely rotating the first roll R1.

Thereafter, the controller 80 (the second shaft control section 82B) sets the calculation mode for the radius of the second roll R2 serving as the supply roll at the "actual measurement mode" (step S20). In this step S20, the controller 80 (the second shaft control section 82B) calculates the radius of the second roll R2 based on a conveyance length of the sheet S in the line for each rotation of the second roll R2. The controller 80 (the second shaft control section 82B) regulates the rotational speed of the second support shaft 12 based on the radius of the second roll R2 calculated in the actual measurement mode and the detection result from the position detection sensor 34 concerning the position of the movable roller 33 in the tension adjusting mechanism 30. The sheet joining operation is restored to the ordinary operation (step S21).

As described above, in the sheet joining in the sheet supply apparatus 1 according to the embodiment, the first shaft control section 82A controls the rotation of the first support shaft 11 supporting the first roll or supply roll R1, and the second shaft control section 82B controls the rotation of the second support shaft 12 supporting the second roll or standby roll R2. The first shaft control section 82A controls the rotation of the first support shaft 11 so that the sheet S is unwound from the first roll R1 at the predetermined running speed. The second shaft control section 82B executes the first rotation control of regulating the rotational speed of the second support shaft 12 so that the peripheral speed of the second roll R2 coincides with the running speed of the sheet S of the first roll R1, and thereafter executes the second rotation control subsequent to the first rotation control.

The second shaft control section 82B regulates the rotational speed of the second support shaft 12 by way of acceleration or deceleration under the second rotation control subsequent to the first rotation control. This makes it possible to regulate the rotational speed of the second support shaft 12 so that the adhesive H on the outer peripheral surface of the second roll R2 arrives at the pressing position Tp when the target joining portion Tr of the sheet S of the first roll R1 meets the pressing position Tp, the residual length of the sheet S of the first roll R1 reaching the predetermined target residual wound length La at the target joining portion Tr. Hence, when the pressing roller 24 in the joining mechanism 20 performs the pressing operation, the respective sheets of the first roll R1 and the second roll R2 can be joined to each other in such a manner that the target joining portion Tr of the sheet S of the first roll R1 is joined to the adhesive H on the outer peripheral surface of the second roll R2. As a result, the residual length of the sheet S of the first roll R1 can reach the predetermined target residual wound length La in the joining of the sheets to each other via the adhesive H on the outer peripheral surface of the second roll R2.

Moreover, with respect to the time when the residual length monitoring section 89 outputs the second control instructive signal in accordance with the residual length of the sheet S of the first roll R1 (step S12), the first shaft control section 82A regulates the rotational speed of the first support shaft 11 supporting the first roll R1 (step S13), and the second shaft control section 82B executes at least the second rotation control among the first rotation control and the second rotation control to the second support shaft 12 supporting the second roll R2 (step S15).

Here, execution of the rotation control for the first support shaft 11 based on the radius of the first roll R1 calculated in the "actual measurement mode" with reference to the conveyance length of the sheet S for each rotation of the first roll R1 may cause frequent fluctuation in the running speed of the sheet S for each rotation due to the acceleration or deceleration. Thus, the target joining portion Tr of the sheet S of the first roll R1 cannot always meet the pressing position Tp at a constant time. In this case, there is a concern that a difference may occur between the time when the target joining portion Tr of the sheet S of the first roll R1 meets the pressing position Tp and the time when the adhesive H on the outer peripheral surface of the second roll R2 arrives at the pressing position Tp, which results in unreliable joining at the target joining portion Tr.

To avoid the difference, in the sheet joining operation, the first shaft control section 82A regulates, based on the presumed radius value of the first roll R1 that is calculated in the "presumption mode" and changes in accordance with the supply of the sheet S, the rotational speed of the first support shaft 11 in response to the second control instructive signal output from the residual length monitoring section 89 so that the running speed of the sheet S from the first roll R1 is constant during a period of time until the pressing roller 24 in the joining mechanism 20 performs the pressing operation after the residual length monitoring section 89 outputs the second instructive signal (step S13). The regulation contributes to suppression of fluctuation in the time when the target joining portion Tr of the sheet S of the first roll R1 meets the pressing position Tp. Further, the second shaft control section 82B can regulate the rotational speed of the second support shaft 12 in response to the second control instructive signal output from the residual length monitoring section 89 so that the adhesive H on the outer peripheral surface of the second roll R2 arrives at the pressing position Tp when the target joining portion Tr of the sheet S of the first roll R1 meets the pressing position Tp (step S15). Accordingly, the target joining portion Tr of the sheet S of the first roll R1 can be reliably joined to the adhesive H on the outer peripheral surface of the second roll R2.

Moreover, the second shaft control section 82B executes the first rotation control by starting the rotation of the second support shaft 12 after the first control instructive signal is output and before the second control instructive signal is output (step S10), and executes the second rotation control subsequent to the first rotation control after the second control instructive signal is output (step S15).

In this aspect, the second shaft control section 82B executes the first rotation control by starting the rotation of the second support shaft 12 before the residual length monitoring section 89 outputs the second control instruction signal. This establishes the state where the rotational speed of the second support shaft 12 is regulated so that the peripheral speed of the second roll R2 coincides with the running speed of the sheet S of the first roll R1 before the second control instructive signal is output. In this case, it is sufficient to regulate the rotational speed of the second support shaft 12 based on the position of the adhesive H in the rotational direction of the second roll R2 under the second rotation control executed by the second shaft control section 82B subsequent to the first rotation control after the second instructive signal is output. Therefore, it is possible to expedite the time to finish the regulation of the rotational speed of the second support shaft 12 under the second rotation control. This contributes to a rapid decrease in disturbances such as fluctuated supply of the sheet S from the first roll R1. Consequently, the adhesive H on the outer peripheral surface of the second roll R2 can more accurately arrive at the pressing position Tp when the target joining portion Tr of the sheet S of the first roll R1 meets the pressing position Tp under the second rotation control executed by the second shaft control section 82B. Accordingly, the residual length of the sheet S of the first roll R1 can more reliably reach the predetermined target residual wound length La in the joining of the sheets to each other via the adhesive H on the outer peripheral surface of the second roll R2.

The embodiment of the present invention is described heretofore, but the present invention should not be limited thereto, and various modifications are available.

(1) In the embodiment, the second shaft control section 82B controls the rotation of the second support shaft 12 supporting the second or standby roll R2 by executing the first rotation control before the second instructive signal is output and executing the second rotation control after the second control instructive signal is output, but should not be limited to this configuration.

The second shaft control section 82B may be configured to stop the rotation of the second support shaft 12 supporting the second or standby roll R2 before the residual length monitoring section 89 outputs the second control instructive signal, and execute both the first rotation control and the second rotation control after the second control instructive signal is output. Under the first rotation control, the second shaft control section 82B regulates at least one of a rotation start time and a rotational acceleration so that the adhesive H moves to a predetermined position in the rotational direction of the second roll R2, when the peripheral speed of the second roll R2 reaches the running speed of the sheet S of the first roll R1 by starting the rotation of the second support shaft 12. Moreover, the second shaft control section 82B regulates the rotational speed of the second support shaft 12 by way of acceleration or deceleration, if necessary, so that the adhesive H at the predetermined position arrives at the pressing position Tp when the target joining portion Tr of the sheet S of the first roll R1 meets the pressing position Tp under the second rotation control subsequent to the first rotation control.

In this aspect, the rotation of the second support shaft 12 is stopped before the residual length monitoring section 89 outputs the second control instructive signal. Hence, the adhesive H locates at a position at a predetermined angle in the rotational direction of the second roll R2 when the second control instructive signal is output. In other words, the position of the adhesive H in the rotational direction of the second roll R2 is determined when the rotation control for the second support shaft 12 is started. Thus, it is easier to move the adhesive H to the predetermined position in the rotational direction of the second roll R2 when the peripheral speed of the second roll R2 reaches the running speed of the sheet S of the first roll R1 owing to the regulation of the rotational speed of the second support shaft under the first rotation control executed after the second control instructive signal is output. The predetermined position can be set in such a manner that, for example, a distance from the predetermined position to the pressing position Tp equals to a distance between the target joining portion Tr of the sheet S of the first roll R1 and the pressing position Tp at the finish of the first rotation control. The adhesive H at the predetermined position can consequently arrive at the pressing position Tp or move closest thereto only with a tolerant deviation when the target joining portion Tr of the sheet S of the first roll R1 meets the pressing position Tp under the second rotation control executed subsequent to the first rotation control. Accordingly, it is sufficient to regulate the rotational speed of the second support shaft 12 by a small amount. This shortens the time required to regulate the rotational speed of the second support shaft 12 under the second rotation control. Further, the adhesive H on the outer peripheral surface of the second roll R2 can more accurately arrive at the pressing position Tp when the target joining portion Tr of the sheet S of the first roll R1 meets the pressing position Tp.

(2) Besides, the second shaft control section 82B may be configured to regulate the rotational speed of the second support shaft 12 so that the peripheral speed of the second roll R2 reaches the running speed of the sheet S of the first roll R1 and the adhesive H on the outer peripheral surface of the second roll R2 arrives at the pressing position Tp when the target joining portion Tr of the sheet S of the first roll R1 meets the pressing position Tp. The second shaft control section 82B adjusts at least one of a rotation start time and a rotational acceleration of the second support shaft 12.

In this aspect, the peripheral speed of the second roll R2 coincides with the running speed of the sheet S of the first roll R1 and the adhesive H on the outer peripheral surface of the second roll R2 arrives at the pressing position Tp when the target joining portion Tr of the sheet S of the first roll R1 meets the pressing position Tp. In this manner, the joining mechanism 20 can more rapidly perform the joining operation of joining the respective sheets of the first roll R1 and the second roll R2 to each other. Consequently, it is possible to expedite sheet supply shift from the first roll R1 to the second roll R2.

(3) Described in the embodiment is the configuration in which the rotary member 17 includes the first support shaft 11 and the second support shaft 12. However, the rotary member 17 may include three or more support shafts for rotatably supporting the rollers at their respective center positions.

(4) Described in the embodiment is the configuration in which the joining unit 23 is moved in the X direction (lateral direction) to thereby cause the pressing roller 24 to press the sheet S of the first roll R1 onto the outer peripheral surface of the second roll R2 in the joining operation by the joining mechanism 20. However, the joining unit 23 should not be limited to this configuration. For example, the joining unit 23 may be moved in the Z direction (vertical direction) in the joining operation by the joining mechanism 20.

(5) Described in the embodiment is the configuration independently including the radius detector 21 for detecting the radius of the second roll or standby roll R2, and the adhesive detector 22 for detecting the position of the adhesive H on the outer peripheral surface of the second roll R2. Alternatively, a single detector may be adopted to detect the radius of the second roll R2 and the position of the adhesive H.

The above-described embodiment mainly includes the invention having the following configurations.

A sheet supply apparatus according to one aspect of the present invention is an apparatus for sequentially unwinding a sheet from a first roll of sheet and a second roll of sheet for sheet supply. The sheet supply apparatus includes: a first support shaft which rotatably supports the first roll at a center position thereof; a second support shaft which rotatably supports the second roll at a center position thereof; a joining mechanism which joins the respective sheets of the first roll and the second roll to each other by a pressing operation of pressing the sheet run from the first roll rotating in association with rotation of the first support shaft to an adhesive provided on an outer peripheral surface of the second roll rotating in association with rotation of the second support shaft; and a controller which controls the rotation of each of the first support shaft and the second support shaft so that a target joining portion of the sheet run from the first roll is joined to the adhesive on the outer peripheral surface of the second roll by the pressing operation of the joining mechanism when a residual length of the sheet of the first roll reaches a predetermined target residual wound length. The controller includes: a residual length calculation section which calculates a radius of the first roll that changes in accordance with the sheet supply from the first roll, and calculates a residual length of the sheet of the first roll from a result of the radius calculation; a residual length monitoring section which monitors the residual length of the sheet of the first roll that has been calculated by the residual calculation section, and outputs a control instructive signal when the residual length of the sheet reaches a watch length that is a sum of a predetermined length and the target residual wound length; a first shaft control section which controls the rotation of the first support shaft in response to the control instructive signal so that the sheet is unwound from the first roll for the sheet supply at a predetermined running speed; and a second shaft control section which controls the rotation of the second support shaft in response to the control instructive signal, the second shaft control section being configured to regulate a rotational speed of the second support shaft so that a peripheral speed of the second roll coincides with the running speed of the sheet of the first roll, and the adhesive on the outer peripheral surface of the second roll arrives at a pressing position where the joining mechanism performs the pressing operation when the target joining portion of the sheet of the first roll meets the pressing position.

According to the sheet supply apparatus, the second shaft control section regulates the rotational speed of the second support shaft in response to the control instructive signal output from the residual length monitoring section so that the adhesive on the outer peripheral surface of the second roll arrives at the pressing position when the target joining portion of the sheet of the first roll meets the pressing position, the residual length of the sheet of the first roll reaching a predetermined target residual wound length at the target joining portion. Hence, when the joining mechanism performs the pressing operation, the respective sheets of the first roll and the second roll can be joined to each other in such a manner that the target joining portion of the sheet of the first roll is joined to the adhesive on the outer peripheral surface of the second roll. As a result, the residual length of the sheet of the first roll can reach a predetermined target residual wound length in the joining of the sheets to each other via the adhesive on the outer peripheral surface of the second roll.

In the sheet supply apparatus, the second shaft control section may be configured to execute: a first rotation control of regulating the rotational speed of the second support shaft so that the peripheral speed of the second roll coincides with the running speed of the sheet of the first roll; and a second rotation control of regulating the rotational speed of the second support shaft so that the adhesive on the outer peripheral surface of the second roll arrives at the pressing position when the target joining portion of the sheet of the first roll meets the pressing position, and the peripheral speed of the second roll coincides with the running speed of the sheet of the first roll, after the first rotation control.

In this aspect, the second shaft control section executes the first rotation control of regulating the rotational speed of the second support shaft so that the peripheral speed of the second roll coincides with the running speed of the sheet of the first roll, and thereafter executes the second rotation control. Accordingly, it is possible to regulate the rotational speed of the second support shaft so that the adhesive on the outer peripheral surface of the second roll arrives at the pressing position when the target joining portion of the first roll meets the pressing position, and the peripheral speed of the second roll coincides with the running speed of the sheet of the first roll.

In the sheet supply apparatus, the second shaft control section may be configured to execute the first rotation control by starting the rotation of the second support shaft before the residual length monitoring section outputs the control instructive signal, and executes the second rotation control subsequent to the first rotation control after the residual length monitoring section outputs the control instructive signal.

In this aspect, the second shaft control section executes the first rotation control by starting the rotation of the second support shaft before the residual length monitoring section outputs the control instructive signal. This establishes the state where the rotational speed of the second support shaft is regulated so that the peripheral speed of the second roll coincides with the running speed of the sheet of the first roll before the control instructive signal is output. In this case, it is sufficient to regulate the rotational speed of the second support shaft based on the position of the adhesive in the rotational direction of the second roll under the second rotation control executed by the second shaft control section subsequent to the first rotation control after the control instructive signal is output. Therefore, it is possible to expedite the time to finish the regulation of the rotational speed of the second support shaft under the second rotation control. This contributes to a rapid decrease in disturbances such as fluctuated supply of the sheet from the first roll. Consequently, the adhesive on the outer peripheral surface of the second roll can more accurately arrive at the pressing position when the target joining portion of the sheet of the first roll meets the pressing position under the second rotation control executed by the second shaft control section. Accordingly, the residual length of the sheet of the first roll can more reliably reach the predetermined target residual wound length in the joining of the sheets to each other via the adhesive on the outer peripheral surface of the second roll.

In the sheet supply apparatus, the second shaft control section may be configured to stop the rotation of the second support shaft before the residual length monitoring section outputs the control instructive signal, and execute the first rotation control and the second rotation control after the residual length monitoring section outputs the control instructive signal. In this configuration, the second shaft control section adjusts at least one of a rotation start time and a rotational acceleration of the second support shaft so that the adhesive moves to a predetermined position in a rotational direction of the second roll, when the peripheral speed of the second roll reaches the running speed of the sheet of the first roll by starting the rotation of the second support shaft under the first rotation control, and regulates the rotational speed of the second support shaft by way of acceleration or deceleration so that the adhesive at the predetermined position arrives at the pressing position when the target joining portion of the sheet of the first roll meets the pressing position under the second rotation control subsequent to the first rotation control.

In this aspect, the rotation of the second support shaft is stopped before the residual length monitoring section outputs the second control instructive signal. Hence, the adhesive locates at a position at a predetermined angle in the rotational direction of the second roll when the control instructive signal is output. In other words, the position of the adhesive in the rotational direction of the second roll is determined when the rotation control for the second support shaft is started. Thus, it is easier to move the adhesive to the predetermined position in the rotational direction of the second roll when the peripheral speed of the second roll reaches the running speed of the sheet of the first roll owing to the regulation of the rotational speed of the second support shaft under the first rotation control executed after the second control instructive signal is output. Accordingly, it is sufficient to regulate the rotational speed of the second support shaft so that the adhesive at the predetermined position arrives at the pressing position when the target joining portion of the sheet of the first roll meets the pressing position under the second rotation control executed subsequent to the first rotation control. This shortens the time required to regulate the rotational speed of the second support shaft under the second rotation control. Further, the adhesive on the outer peripheral surface of the second roll can more accurately arrive at the pressing position when the target joining portion of the sheet of the first roll meets the pressing position.

In the sheet supply apparatus, the second shaft control section may be configured to regulate the rotational speed of the second support shaft so that the peripheral speed of the second roll reaches the running speed of the sheet of the first roll and the adhesive on the outer peripheral surface of the second roll arrives at the pressing position when the target joining portion of the sheet of the first roll meets the pressing position.

In this aspect, the peripheral speed of the second roll coincides with the running speed of the sheet of the first roll, and the adhesive on the outer peripheral surface of the second roll arrives at the pressing position when the target joining portion of the sheet of the first roll meets the pressing position. In this manner, the joining mechanism can more rapidly perform the joining operation of joining the respective sheets of the first roll and the second roll to each other. Consequently, it is possible to expedite the sheet supply shift from the first roll to the second roll.

In the sheet supply apparatus, the first shaft control section may be configured to shift the control for the rotation of the first support shaft in response to the control instructive signal from a control using a sheet conveyance length by each rotation of the first roll to a control using the radius of the first roll which the residual length calculation section refers to when the residual length calculation section calculates the residual length of the sheet of the first roll, and regulate the rotational speed of the first support shaft based on a presumed radius value calculated on a change in the radius of the first roll so that the running speed of the sheet from the first roll is constant.

Execution of the rotation control for the first support shaft based on the conveyance length of the sheet for each rotation of the first roll may cause frequent fluctuation in the running speed of the sheet for each rotation due to the acceleration or deceleration. Thus, the target joining portion Tr of the sheet S of the first roll R1 cannot always meet the pressing position Tp at a constant time. In this case, a difference may occur between the time when the target joining portion of the sheet of the first roll meets the pressing position and the time when the adhesive on the outer peripheral surface of the second roll arrives at the pressing position, which results in unreliable joining at the target joining portion.

To avoid the difference, the first shaft control section controls the rotation of the first support shaft in response to the control instructive signal output from the residual length monitoring section by shifting from the control using the conveyance length of the sheet for each rotation of the first roll to the control using the presumed radius value obtained by calculating and presuming the radius of the first roll that changes in accordance with the supply of the sheet. The first shaft control section then regulates the rotational speed of the first support shaft so that the running speed of the sheet from the first roll is constant based on the presumed radius value of the first roll that changes in accordance with the supply of the sheet. The regulation contributes to suppression of fluctuation in the time when the target joining portion of the sheet of the first roll meets the pressing position. Accordingly, the target joining portion of the sheet of the first roll can be reliably joined to the adhesive on the outer peripheral surface of the second roll.

A sheet supply method according to another aspect of the present invention is a sheet supply method for sequentially unwinding a sheet from a first roll of sheet and a second roll of sheet for sheet supply by using a sheet supply apparatus including: a first support shaft which rotatably supports the first roll of sheet at a center position thereof; a second support shaft which rotatably supports the second roll of sheet at a center position thereof; and a joining mechanism which joins the respective sheets of the first roll and the second roll to each other by a pressing operation of pressing the sheet run from the first roll to an adhesive provided on an outer peripheral surface of the second roll. The sheet supply method includes: a sheet supply step of unwinding the sheet from the first roll at a predetermined running speed by rotating the first support shaft for sheet supply; a rotational speed regulation step of regulating a rotational speed of the second support shaft so that a peripheral speed of the second roll coincides with the running speed of the sheet of the first roll, and the adhesive on the outer peripheral surface of the second roll arrives at a pressing position where the pressing operation is performed by the joining mechanism when a target joining portion of the sheet unwound from the first roll meets the pressing position, a residual length of the sheet of the first roll reaching a predetermined target residual wound length at the target joining portion; and a joining step of causing the joining mechanism to perform the pressing operation so that the target joining portion of the sheet of the first roll is joined to the adhesive on the outer peripheral surface of the second roll.

According to the sheet supply method, in the sheet supply step, the first support shaft is rotated to unwind the sheet from the first roll at the predetermined running speed. In the state where the sheet is unwound from the first roll, the rotational speed of the second support shaft supporting the second roll is regulated in the rotational speed regulation step. In the rotational speed regulation step, the rotational speed of the second support shaft is regulated so that the peripheral speed of the second roll coincides with the running speed of the sheet of the first roll, and the adhesive on the outer peripheral surface of the second roll arrives at the pressing position when the target joining portion of the sheet of the first roll meets the pressing position. When the joining mechanism performs the pressing operation in the joining step, the respective sheets of the first roll and the second roll can be joined to each other in such a manner that the target joining portion of the sheet of the first roll is joined to the adhesive on the outer peripheral surface of the second roll. As a result, the residual length of the sheet of the first roll can reach the predetermined target residual wound length in the joining of the sheets to each other via the adhesive on the outer peripheral surface of the second roll.

Conclusively, the present invention makes it possible to lead a residual length of a sheet of a first roll to a predetermined target residual wound length in joining of the sheets of the first roll and a second roll to each other via an adhesive on outer peripheral surface of the second roll.

The invention claimed is:

1. A sheet supply apparatus for sequentially unwinding a first sheet from a first roll and a second sheet from a second roll, the sheet supply apparatus comprising:
    a first support shaft configured to rotatably support the first roll at a center position thereof;
    a second support shaft configured to rotatably support the second roll at a center position thereof;
    a joining mechanism configured to join the first sheet and the second sheet to each other by a pressing operation of pressing the first sheet to an adhesive on an outer peripheral surface of the second roll; and
    a controller configured to control a rotation of the first support shaft and a rotation of the second support shaft such that a target joining portion of the first sheet is joined to the adhesive on the outer peripheral surface of the second roll due to the pressing operation by the joining mechanism when a residual length of the first sheet reaches a target residual wound length,
    wherein the controller includes:
        a residual length calculation section configured to calculate: (i) a radius of the first roll that changes in accordance with a sheet supply from the first roll based on a running speed of the first sheet and a rotational speed of the first support shaft; (ii) a sheet thickness of the first sheet in accordance with a reduction in the radius of the first roll for each rotation of the first roll; and (iii) the residual length of the first sheet from a result of calculation of the radius of the first roll and the sheet thickness of the first sheet;
        a residual length monitoring section configured to monitor the residual length of the first sheet that has been calculated by the residual length calculation section, and output a control instructive signal when the residual length of the first sheet reaches a watch length that is a sum of a predetermined length and the target residual wound length;
        a first shaft control section configured to control the rotation of the first support shaft in response to the control instructive signal such that the first sheet is unwound at a predetermined running speed; and
        a second shaft control section configured to control the rotation of the second support shaft in response to the control instructive signal, and
    wherein the second shaft control section is configured to execute:
        a first rotation control of regulating a rotational speed of the second support shaft such that a peripheral speed of the second roll coincides with the predetermined running speed of the first sheet; and
        a second rotation control of regulating the rotational speed of the second support shaft such that the rotation of the second support shaft is accelerated or decelerated in accordance with a distance between the adhesive and a pressing position where the joining mechanism performs the pressing operation in a rotational direction of the second roll after the first rotation control, and subsequently, such that the peripheral speed of the second roll is restored to and maintained at the predetermined running speed of the first sheet when the adhesive on the outer peripheral surface of the second roll arrives at the pressing position while the target joining portion of the first sheet meets the pressing position.

2. The sheet supply apparatus according to claim 1, wherein the second shaft control section is configured to execute:
   (i) the first rotation control by starting the rotation of the second support shaft before the residual length monitoring section outputs the control instructive signal; and
   (ii) the second rotation control subsequent to the first rotation control after the residual length monitoring section outputs the control instructive signal.

3. The sheet supply apparatus according to claim 2, wherein
   the first shaft control section is configured to control the rotation of the first support shaft by shifting, based on the control instructive signal, from a control using a sheet conveyance length by each rotation of the first roll to a control using the radius of the first roll which the residual length calculation section refers to when the residual length calculation section calculates the residual length of the first sheet, and regulating the rotational speed of the first support shaft based on a presumed radius value calculated on a change in the radius of the first roll such that the predetermined running speed of the first sheet is constant.

4. The sheet supply apparatus according to claim 1, wherein the second shaft control section is configured to:
   stop the rotation of the second support shaft before the residual length monitoring section outputs the control instructive signal, and execute the first rotation control and the second rotation control after the residual length monitoring section outputs the control instructive signal;
   adjust at least one of a rotation start time and a rotational acceleration of the second support shaft such that the adhesive moves to a predetermined position in the rotational direction of the second roll, when the peripheral speed of the second roll reaches the predetermined running speed of the first sheet by starting the rotation of the second support shaft under the first rotation control; and
   regulate the rotational speed of the second support shaft by acceleration or deceleration such that the adhesive at the predetermined position arrives at the pressing position when the target joining portion of the first sheet meets the pressing position under the second rotation control subsequent to the first rotation control.

5. The sheet supply apparatus according to claim 4, wherein
   the first shaft control section is configured to control the rotation of the first support shaft by shifting, based on the control instructive signal, from a control using a sheet conveyance length by each rotation of the first roll to a control using the radius of the first roll which the residual length calculation section refers to when the residual length calculation section calculates the residual length of the first sheet, and regulating the rotational speed of the first support shaft based on a presumed radius value calculated on a change in the radius of the first roll such that the predetermined running speed of the first sheet is constant.

6. The sheet supply apparatus according to claim 1, wherein the first shaft control section is configured to control the rotation of the first support shaft by shifting, based on the control instructive signal, from a control using a sheet conveyance length by each rotation of the first roll to a control using the radius of the first roll which the residual length calculation section refers to when the residual length calculation section calculates the residual length of the first sheet, and regulating the rotational speed of the first support shaft based on a presumed radius value calculated on a change in the radius of the first roll such that the predetermined running speed of the first sheet is constant.

7. A sheet supply method for sequentially unwinding a first sheet from a first roll and a second sheet from a second roll using a sheet supply apparatus including: a first support shaft which rotatably supports the first roll at a center position thereof; a second support shaft which rotatably supports the second roll at a center position thereof, and a joining mechanism which joins the first sheet and the second sheet to each other by a pressing operation of pressing the first sheet to an adhesive on an outer peripheral surface of the second roll, the sheet supply method comprising:
   a sheet supply step of unwinding the first sheet at a predetermined running speed by controlling a rotation of the first support shaft;
   a residual length calculation step of calculating: (i) a radius of the first roll that changes in accordance with a sheet supply from the first roll based on a running speed of the first sheet and a rotational speed of the first support shaft; (ii) a sheet thickness of the first sheet in accordance with a reduction in the radius of the first roll for each rotation of the first roll; and (iii) the residual length of the first sheet from a result of calculation of the radius of the first roll and the sheet thickness of the first sheet;
   a residual length monitoring step of monitoring the residual length of the first sheet, and determining whether the residual length of the first sheet reaches a watch length that is a sum of a predetermined length and a target residual wound length;
   a first rotational speed regulation step of executing a first rotation control of regulating a rotational speed of the second support shaft based on a determination result in the residual length monitoring step such that a peripheral speed of the second roll coincides with the predetermined running speed of the first sheet;
   a second rotational speed regulation step of executing a second rotation control of regulating the rotational speed of the second support shaft such that the rotation of the second support shaft is accelerated or decelerated in accordance with a distance between the adhesive and a pressing position where the joining mechanism performs the pressing operation in a rotational direction of the second roll after the first rotation control, and subsequently, such that the peripheral speed of the second roll is restored to and maintained at the predetermined running speed of the first sheet when the adhesive on the outer peripheral surface of the second roll arrives at the pressing position while a target joining portion of the first sheet meets the pressing position; and
   a joining step of causing the joining mechanism to perform the pressing operation such that the target joining portion of the first sheet is joined to the adhesive on the outer peripheral surface of the second roll.

* * * * *